United States Patent Office 3,466,551
Patented Sept. 9, 1969

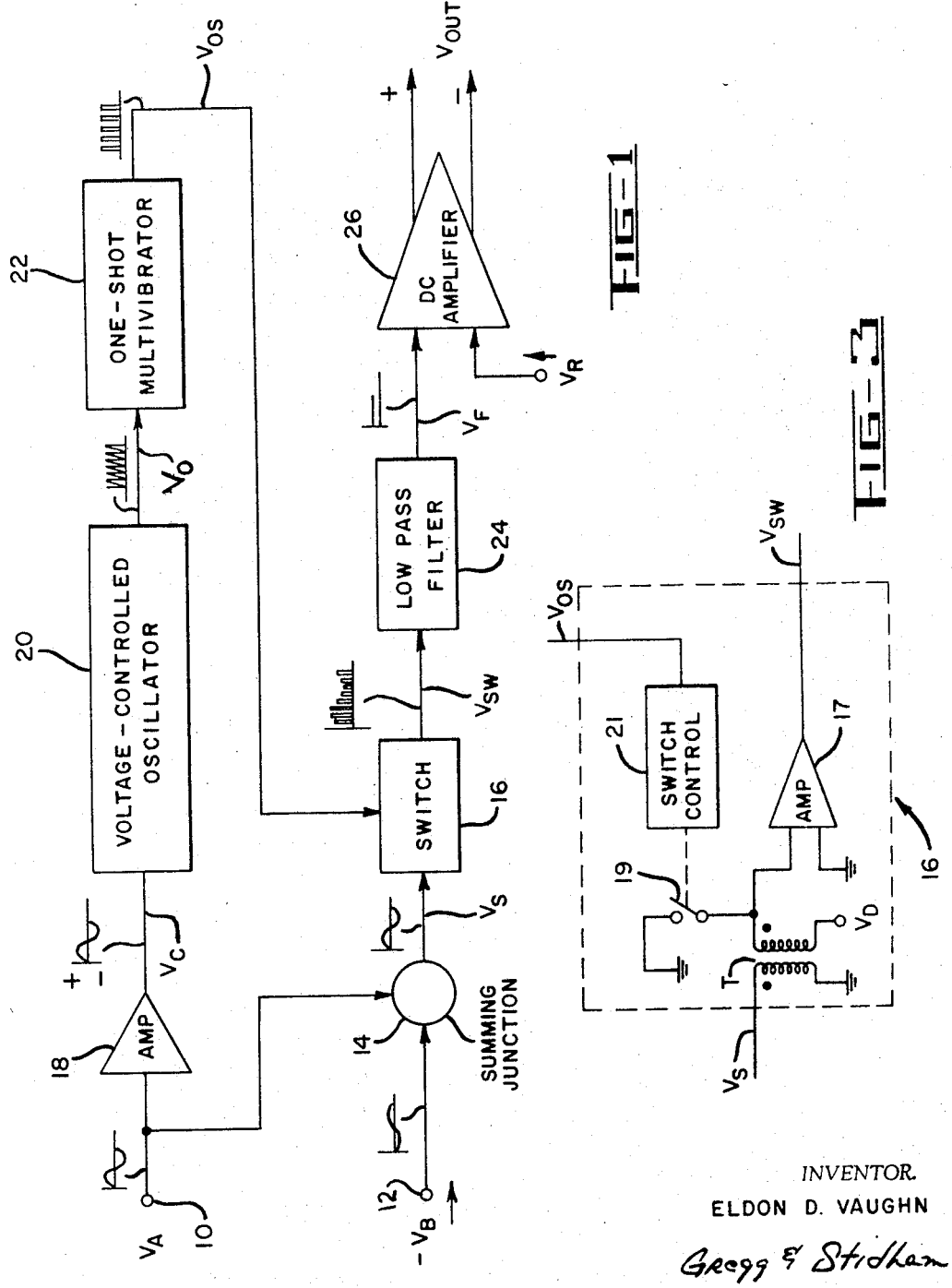

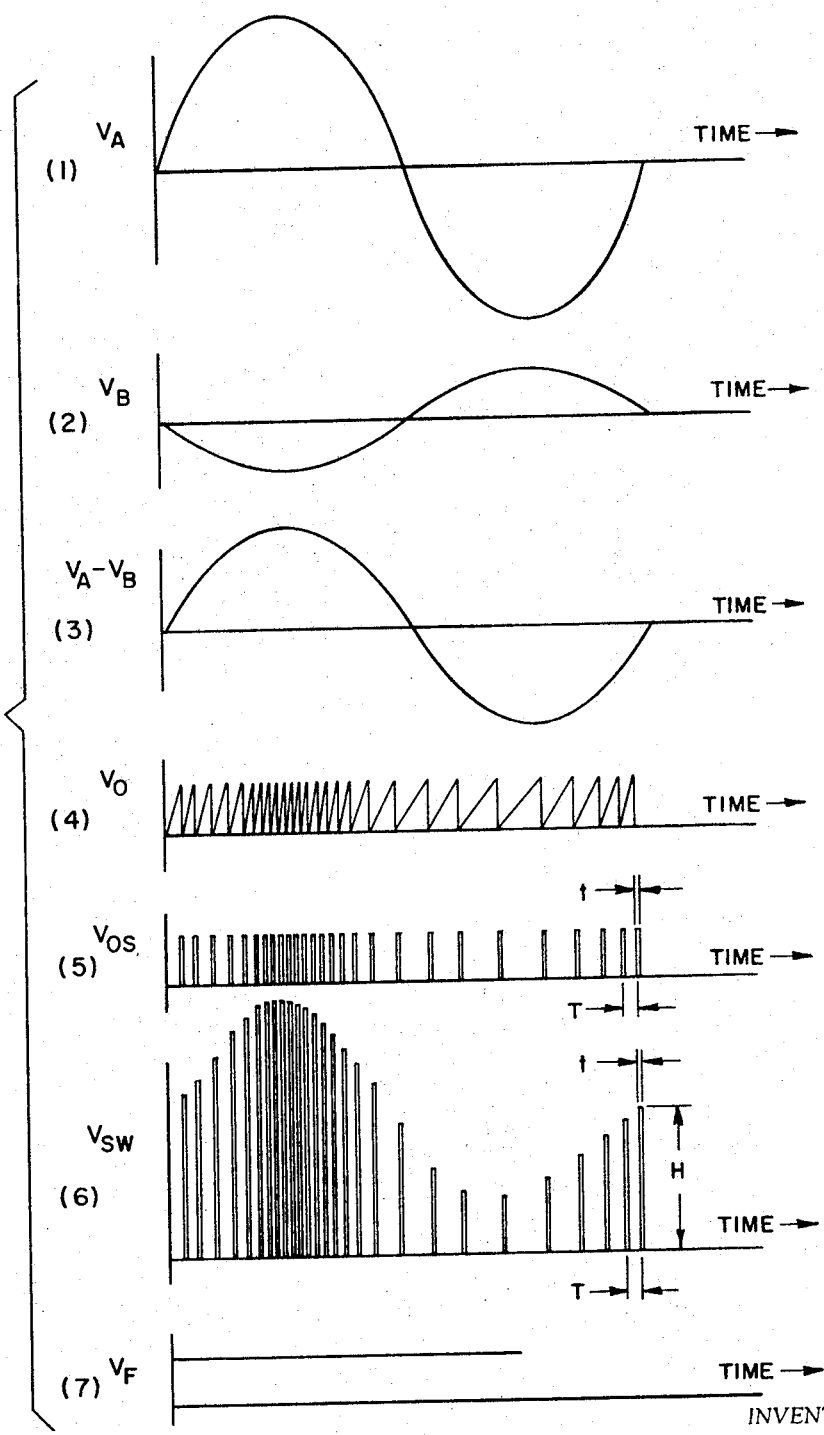

3,466,551
NULL DETECTOR EMPLOYING A PRODUCT DETECTOR THEREIN
Eldon D. Vaughn, Berkeley, Calif., assignor to Warner Lambert Pharmaceutical Company, Morris Plains, N.J., a corporation of Delaware
Filed Dec. 1, 1966, Ser. No. 598,253
Int. Cl. H03k 5/20; H03b 3/02
U.S. Cl. 328—146                 7 Claims

ABSTRACT OF THE DISCLOSURE

Method and means for detecting a null or equality between first and second analog signals wherein the second may contain interference components. The signals are added together in phase opposition to produce a resultant signal which is gated on and off for fixed periods of time at a modulation repetition rate derived from the first signal to produce a frequency modulated signal that is integrated by passage through a low-pass filter to produce a signal having a component proportional to the difference of analog signals regardless of interference components.

---

This invention relates to a product detector for the multiplication of analog signals and to a null detector employing the product detector therein.

Devices for computing the product of analog signals are well known and include electromechanical and electronic multipliers. Electromechanical multipliers are bulky and have a low frequency response. Hall effect type multipliers are known but require the use of a magnetic device. Null detectors also are well known and are used for the comparison of two analog signals for equal amplitude. One method of null detection includes subtracting one signal from the other, and detecting the resultant signal, which is at about the zero level, by a diode detector. Noise and/or hum are often present and introduce errors in the output of such prior art detectors.

An object of this invention is the provision of an improved method of multiplying signals and an improved product detector for accurately and simply providing an output which is the product of first and second analog input signals.

An object of this invention is the provision of a product detector having an output accurately related to the product of the input signals under all operating conditions including the condition wherein one input is at or near the zero level.

An object of this invention is the provision of an improved method of null detection and a null detector by means of which a condition of zero resultant signal is readily detected in the presence of a noise, hum, and similar electrostatically and electromagnetically induced error signals.

These and other objects and advantages are obtained by use of a novel sampling technique. The product detector includes a switching or gating circuit to which one analog signal comprising the multiplier is connected. A second analog signal of the same frequency as the first signal and comprising the multiplicand is used to control the frequency of a relaxation-type oscillator. The output from the oscillator, in turn, is used to trigger a monostable multivibrator for the production of switching pulses of constant width and having a frequency dependent upon the amplitude of the second analog signal. The output from the switch includes two D-C (zero frequency) terms; one of which comprises a constant D-C term depending upon the characteristics of the switching circuit and the other of which is proportional to the product of the analog input multiplicand and multiplier signals. By filtering the switched output through a low-pass filter, only the low frequency terms remain. A constant potential reference source may be used to offset the constant D-C term from the filtered output whereby only the term directly proportional to the product of the analog input signals remains.

The above-described product detector is employed in a null detector arrangement by the inclusion of a summing junction. The signals to be compared are fed to the summing junction 180° out of phase with one another. The output of the summing junction then feeds the switching or gating circuit as described above. A standard signal at the frequency of interest must be applied to the relaxation oscillator as described above. The remainder of the circuitry is substantially the same as that of the above-described product detector. With this arrangement a condition of zero resultant signal from the summing junction is readily detected for the condition that the standard signal is not at 90° phase relation to either of the inputs to the summing junction.

In the drawings, wherein like reference characters refer to the same parts in the several views:
FIGURE 1 is a block diagram showing a novel product detector embodying this invention, which product detector is incorporated in a null detector also embodying this invention,
FIGURE 2 is a graph of waveforms which occur at various points in the null detector shown in FIGURE 1, and
FIGURE 3 is a circuit diagram of a switch which may be employed in the product detector shown in FIGURE 1.

Reference is first made to FIGURE 1 wherein analog input signals $V_A$ and $-V_B$ comprising the same frequency but having a relative phase of 180° at that frequency are shown applied to the input terminals 10 and 12 of the null detector of this invention. For example only, but not by way of limitation, the analog signals $V_A$ and $-V_B$ may be derived from the photocell detector outputs included in a dual beam spectrophotometer which photocells are responsive to the light beams directed along two different paths.

The analog signals $V_A$ and $-V_B$ are fed to a summing junction 14 of conventional design where they are algebraically added, and since they are 180° out of phase at the common frequency the output from the junction comprises the voltage difference therebetween at that frequency. When the null detector is included in a null-balance servo system, the input signals $V_A$ and $-V_B$ are adjusted to minimize the amplitude difference therebetween whereby a near zero error voltage, designated $V_S$, is obtained from the summing junction 14. The error voltage $V_S$ is fed to the input of a switching or gating circuit 16 of any suitable conventional design for sampling thereof in a manner described below.

For simplicity the analog signals $V_A$ and $-V_B$ are described as sine waves with noise and hum which may be designated as follows:

(1)   $V_A = A \sin \omega t + E_{HA} f_A(120\pi t) + E_{NA} F_A(t)$ (2)   $-V_B = -B \sin \omega t + E_{HB} f_B(120\pi t) + E_{NB} F_B(t)$ where:

$E_{HA} f_A(120\pi t)$ = hum of $V_A$,
$E_{NA} F_A(t)$ = noise of $V_A$,
$E_{HB} f_B(120\pi t)$ = hum of $V_B$,
$E_{NB} F_B(t)$ = noise of $V_B$,
$F_A(t)$ and $F_B(t)$ are random functions of time, and
$f_A(120\pi t)$ and $f_B(120\pi t)$ are periodic (e.g., sine) functions of time.

From the summation of Equations 1 and 2, $V_S$ may be expressed as:

(3) $\quad V_S = (A-B)\sin\omega t + E_H \sin(120\pi t) + E_N F(t)$

For simplicity, in the summation Equation 3 the hum term is identified as a single sine function, and the noise term is expressed in general terms rather than the true summation of the noise of signals $V_A$ and $V_B$. The hum, for example, may result from the 60 Hz. line frequency and generally includes higher harmonic components not shown in Equation 3. Most noise is characterized by energy distributed over a wide frequency range and with little energy concentrated at any particular frequency. This face is of significance in the circuit of this invention as will become apparent hereinbelow.

In the null detector, a switching signal $V_{OS}$ for opening and closing the switching circuit 16 is derived from a periodic signal of the same frequency as $V_A$ and $-V_B$, and for convenience one of the input signals, $V_A$, may be employed for deriving the switching signal if $V_A$ has a negligible amount of noise and hum, i.e., if $E_{HA} \ll\ll A$ and if $E_{NA} \ll\ll A$. The signal $V_A$ is fed to an amplifier 18 having a constant amplitude output, designated $V_C$. Amplifiers which provide a constant peak-to-peak output amplitude with changes in the input peak-to-peak amplitude are well known and require no detailed description.

The constant peak-to-peak amplitude output $V_C$ from the amplifier 18 is fed to oscillator 20 of the relaxation type. The frequency of oscillation of the relaxation oscillator is controlled by the amplitude of the alternating voltage $V_C$ about some nominal frequency $F_0$. When the signal $V_C$ goes positive the frequency of oscillation increases, and when the signal $V_C$ goes negative the frequency decreases. The constant amplitude sine wave modulating signal may be expressed as, (4) $\quad V_C = C \sin \omega t$ where C is the amplitude of the signal, which is constant. With this constant amplitude sine wave modulating signal applied to the relaxation oscillator, the oscillator output comprises a train of pulses having a frequency of (5) $\quad f_0 = F_0(1 + kC \sin \omega t)$ where:

$F_0$ = the natural oscillator frequency, and $kC/F_0 \leq 1$

The analog signals $A \sin \omega t$, $B \sin \omega t$ and $(A-B)\sin \omega t$, and the oscillator output $V_0$, are depicted as waveforms 1 through 4 in FIGURE 2.

The output from the oscillator 20 is coupled to a monostable multivibrator 22 for actuation thereof at the frequency $f_0$. The multivibrator 22 produces a pulse train $V_{OS}$, shown simplified at waveform 5 of FIGURE 2, having pulses of a fixed pulse width, designated $t$, and a modulated repetition rate of $f_0$. The amplitude of the pulse train is of a constant value during time $t$ and is zero at all other times.

The pulse train $V_{OS}$ is fed to the switch 16 for switching the same between conducting and nonconducting conditions; the switch being opened during the time $t$ and closed the remainder of the time. The output from the switch is, therefore, $$V_{SW} = V_D + V_S \text{ (during pulse time } t\text{)}$$

and $V_{SW} = 0$ (during the remainder of the switching cycle)

where, $V_D$ = a D-C bias voltage.

As seen at the simplified waveform 6 of FIGURE 2 the output $V_{SW}$ from the switch comprises pulses of fixed width $t$, having a frequency $f_0$ and amplitude related to the input signal $V_S$. A suitable switch 16 which functions to provide the above-described switch output is shown in FIGURE 3, which switch comprises an amplifier 17 with an input transformer, T, through which the signal $V_S$ is fed to the amplifier. One end of the transformer secondary winding is connected to a source of DC bias voltage $V_D$ while the other end thereof is connected to the input terminal of the amplifier. The amplifier input terminal also is connected to ground potential through a switch 19, the operation of which switch is controlled by a switch control circuit 21 having as an input the signal $V_{OS}$ from the 1-shot multivibrator 22. The switch 19 is opened during pulse time $t$ and closed during the remainder of the switching cycle. In practice the switch 19 comprises a transistor, or the like, which is switched between conducting and cut-off conditions by the switch control circuit 21.

The output $V_{SW}$ from the switch 16 is coupled to a low-pass filter 24 for integration thereof. The output from the filter is a D-C signal designated $V_F$ having a magnitude related to the product of the signals $V_S$ and $V_C$. The output $V_{SW}$ from the switch, and the low pass filter $V_F$ also include a constant term which may be balanced out by means of a D-C differential amplifier 26 having as one input the signal $V_F$. A second signal $V_R$ of the same amplitude as the constant term in the output $V_F$ supplies a second input to the differential amplifier to balance out the constant term in the output of the amplifier. The amplifier output $V_{OUT}$ therefore comprises the product of $V_S$ and $V_C$. When the product detector is utilized in a null detecting system as illustrated in FIGURE 1 wherein the signal $V_C$ is of constant amplitude, the output from the D-C amplifier 26 is the product of a constant and $V_S$, which is simply proportional to $V_S$.

From an examination of the waveform of the switch output $V_{SW}$ (FIGURE 2, waveform 6) the average low frequency value of $V_{SW}$ is, (6) $\quad V_{\text{avg.}} = \dfrac{t}{\dfrac{1}{f_0}}(V_D + V_S)$ (7) $\quad\quad\quad = tf_0(V_D + V_S)$ Substituting Equation 5 for the expression of $f_0$ into Equation 7

(8) $\quad V_{\text{avg.}} = F_0 t(1 + kC \sin \omega t)(V_D + V_S)$
(9) $\quad\quad\quad = F_0 t(V_D + V_S) + F_0 tCk(V_D + V_S)\sin \omega t$
(10) $\quad\quad\quad = F_0 t V_D + F_0 t V_S + F_0 tkCV_D \sin \omega t + F_0 tkCV_S \sin \omega t$ It will be seen that the first term of Equation 10 is a constant DC term (which is subsequently balanced out at the differential D-C amplifier). The second term is a sine function which provides an output at all frequency components of $V_S$ and the third term is also a sine function at a frequency of $\omega/2\pi$. The integral of the second and third term sine functions equals zero, of course, and therefore these terms contribute nothing to the output from the low pass filter 24. The fourth term, $F_0 tkCV_S \sin \omega t$, is a product term which, as shown below, yields a D-C term proportional to that part of $V_S$ which is at the frequency $\omega/2\pi$.

Substituting the value of $V_S$ from Equation 3 into the fourth term of Equation 10 the following expression is derived,

(11) $\quad (F_0 tkC \sin \omega t)[(A-B)\sin \omega t + E_H \sin \pi 120 t + E_N F(t)]$ or,

(12) $\quad F_0 tkC(A-B)\sin^2 \omega t + F_0 tkCE_H \sin \omega t \sin \pi 120 t + F(t)F_0 tkCE_N \sin \omega t$ Because of the small amount of noise energy at the frequency $\omega/2\pi$ of $F(t)$, the third term of Expression 12 contributes substantially nothing to the output from the filter 24. Utilizing a sine squared formula of angles, the first term of Expression 12 may be rewritten,

(13)
$$F_0 tkC(A-B)\sin^2 \omega t = \frac{F_0 tkC(A-B)(1-\cos 2\omega t)}{2}$$

(14)
$$= \frac{F_0 tkC(A-B)}{2} - \frac{F_0 tkC(A-B)\cos 2\omega t}{2}$$

Utilizing a formula for the product of the sine and cosine of two angles, the second term of Equation 12 may be rewritten as,

(15)
$$F_0 tkCE_H \sin \omega t \sin \pi 120 t = \frac{F_0 tkCE_H \cos(\omega - \pi 120)t}{2} + \frac{F_0 tkCE_H \cos(\omega + 120\pi)t}{2}$$

It will be seen that the second term of Equation 14 and (assuming that $\omega \neq \pi 120$) all of the terms of Equation 15 are A-C terms which contribute nothing to the output from the low pass filter 24. The only term of Equations 14 and 15 at zero frequency is $F_0 tkC(A-B)/2$, which term is proportional only to that part of $V_S$ which is at frequency $\omega/2\pi$. By the elimination of the noise and hum components from the output of the product detector, it will be apparent that the detection of the condition wherein the term $(A-B) \sin \omega t$ is substantially zero is readily accomplished with the apparatus of this invention.

The invention having been described in detail in accordance with the requirements of the Patent Statutes, various changes and modifications may suggest themselves to those skilled in the art, and it is intended that such changes and modifications shall fall within the spirit and scope of the invention as defined in the appended claims.

I claim:
1. A null detector for detecting a condition of substantially zero resultant signal of first and second A-C analog signals of the same frequency comprising:
   means for adding said first and second signals in phase opposition to provide an output related to the difference in magnitude of said signals,
   switch means having as an input the output from the adding means,
   means producing switching pulses of substantially fixed pulse width and modulated in frequency at the frequency of said first and second A-C signals,
   means coupling the switching pulses to said switch means to open and close the same, and
   means filtering the output from the switch means, the output from the switch means being related to the difference in said first and second signals.

2. The null detector as defined in claim 1 wherein the means producing switching pulses includes:
   means producing a constant amplitude A-C signal at the same frequency as the first and second A-C signals,
   a relaxation oscillator to which said constant amplitude A-C signal is connected for control of the oscillator frequency, and
   a monostable multivibrator to which the output from the relaxation oscillator is connected for control of the multivibrator frequency, the multivibrator output comprising pulses of substantially fixed pulse width.

3. The null detector as defined in claim 1 including means for cancelling from the output from the filtering means a constant potential whereby the output from the cancelling means is proportional to the difference in amplitude of said first and second signals and has a polarity dependent upon which of said signals is largest.

4. A method of detecting a resultant null condition between first and second A-C analog signals of the same frequency comprising:
   subtracting the first signal from the second signal to obtain a resultant signal,
   applying the resultant signal to a switching means,
   opening and closing said switching means for fixed intervals of time at a modulated repetition rate equal to the frequency of said first and second signals, and
   filtering the output from the switching means to obtain a signal related to said resultant signal.

5. The method of detecting as defined in claim 4 including:
   cancelling from the filtered output from the switching means a constant amplitude D-C signal to provide a signal proportioned to the difference in said first and second signals.

6. A null detector for detecting a condition of substantial equality between first and second analog signals of the same frequency wherein the second signal may contain hum and noise components comprising:
   a pair of input terminals adapted to separately receive said first and second analog signals in phase opposition,
   adding means connected to said input terminals for adding together said analog signals in phase opposition,
   a constant-peak-amplitude amplifier connected to the input terminal receiving said first signal and producing a constant peak amplitude signal of the frequency of said first signal,
   means connected to the output of said amplifier for producing switching pulses of fixed pulse width and frequency modulated in accordance with the amplitude variation of the output of said amplifier,
   switching means connected to the output of said adding means and controlled by said switching pulses for passing the output of said adding means in pulses of fixed duration and frequency modulation according to the varying amplitude of the signal from said amplifier, and
   a low-pass filter connected to the output of said switching means producing a substantially zero frequency signal related to the difference between said first and second signals.

7. The null detector of claim 6 further defined by a direct current differential amplifier connected to the output of said low-pass filter, and means applying a second direct current input to said direct current amplifier to balance out a constant term of the low-pass filter output and leave only a signal directly proportional to the difference in first and second analog signals regardless of hum and noise components in said second signal.

References Cited

UNITED STATES PATENTS

| | | | |
|---|---|---|---|
| 2,784,909 | 3/1957 | Kirkpatrick | 235—194 |
| 3,163,751 | 12/1964 | Millsap et al. | 235—194 |
| 3,217,151 | 11/1965 | Miller et al. | 235—194 |
| 3,393,307 | 7/1968 | Courtenay et al. | 235—194 X |

MALCOLM A. MORRISON, Primary Examiner

J. F. RUGGIERO, Assistant Examiner

U.S. Cl. X.R.

235—194